(12) United States Patent
Sunaga et al.

(10) Patent No.: US 6,408,562 B1
(45) Date of Patent: Jun. 25, 2002

(54) INTRA-LINE FISHING ROD

(75) Inventors: Shunji Sunaga; Shoichi Koganei; Masaru Akiba, all of Tokyo; Tomoyoshi Tsurufuji, Saitama; Yutaka Kurano, Tokyo; Toyoaki Takimoto, Tokyo; Toshihiro Kurokawa, Tokyo, all of (JP)

(73) Assignee: Daiwa Seiko, Inc., Tokyo (JP)

( * ) Notice: Subject to any disclaimer, the term of this patent is extended or adjusted under 35 U.S.C. 154(b) by 640 days.

(21) Appl. No.: 08/558,661

(22) Filed: Nov. 16, 1995

(30) Foreign Application Priority Data

| Nov. 16, 1994 | (JP) | 6-306930 |
| Mar. 10, 1995 | (JP) | 7-079913 |
| May 10, 1995 | (JP) | 7-135992 |
| May 19, 1995 | (JP) | 7-145259 |

(51) Int. Cl.$^7$ .............................................. A01K 87/04
(52) U.S. Cl. ........................................... 43/24; 43/18.1
(58) Field of Search ..................... 43/18.1, 24

(56) References Cited

U.S. PATENT DOCUMENTS

| 1,595,275 A | * | 8/1926 | White | 43/24 |
| 2,282,618 A | * | 5/1942 | Stewart | 43/24 |
| 2,334,646 A | * | 11/1943 | Price | 43/24 |
| 2,777,239 A | | 1/1957 | Cushman | |
| 3,513,582 A | * | 5/1970 | Carabasse | 43/24 |
| 5,564,214 A | * | 10/1996 | Tsurufuji | 43/24 |

FOREIGN PATENT DOCUMENTS

| AU | 249360 | * | 8/1963 | 43/24 |
| FR | 2123967 | | 9/1972 | |
| JP | 1-304836 | | 12/1989 | |
| JP | 4-341133 | | 11/1992 | |
| JP | 5-88259 | | 12/1992 | |
| JP | 5-268858 | | 10/1993 | |
| JP | 5-88259 | | 12/1993 | |

OTHER PUBLICATIONS

Patent Abstracts of Japan; vol. 950, No. 002; Feb. 10, 1995.

* cited by examiner

Primary Examiner—Kurt Rowan
(74) Attorney, Agent, or Firm—Liniak, Berenato, Longacre & White

(57) ABSTRACT

In an intra-line fishing rod, a rod tube comprises a synthetic resin as a matrix, and is reinforced by reinforced fibers. A guide is formed integrally with and projects from an inner surface of the rod tube. A cushioning portion is formed between the guide and a body layer of the rod tube which is composed predominantly of axially-extending fibers, and cushioning portions are formed respectively at front and rear sides of the guide connected to the inner surface of the rod tube. The cushioning portions are smaller in bending modulus than a bulge portion region of the guide for contact with a fishline, and the inner surface is formed with a mirror-like smoothness.

23 Claims, 9 Drawing Sheets

INTRA-LINE FISHING ROD

BACKGROUND OF THE INVENTION a) Field of the Invention

This invention relates to an intra-line fishing rod having improved properties for passing the fishline therethrough. For the intra-line fishing rod, annular fishline guides or a spiral fishline guide are provided within a rod tube which is formed with an improved inner surface which reduces interior frictional resistance on the fishline. This invention also relates to an improved method by which a rod tube comprises a thermosetting resin or a thermoplastic resin as a matrix, and is reinforced by reinforced fibers, whereby the fishline guide member is formed on the inner surface of the rod tube.

b) Description of Related Art

Conventional intra-line fishing rods suffer from numerous drawbacks which reduce rod strength, hinder performance, and tend to damage the fishline.

Japanese Patent Unexamined Publication No. 4-341133 discloses a fishing rod in which annular fishline guides for a fishline, made of a monofilament of fibers, are molded integrally on an inner peripheral surface of a rod tube so as to enhance the sliding movement of the fishline. Japanese Utility Model Unexamined Publication No. 5-88259 discloses a tubular member such as a rod tube in which a prepreg for constituting the rod tube is wound on a resin tape wound spirally on a metal core, so that a spiral protuberance (guide for a fishline) is integrally formed at the same time, using this prepreg.

However, when the guides are to be formed integrally on the inner surface of the rod tube, a prepreg is wound on a metal core, and is heated while being pressurized by a tightening tape. In the construction disclosed in Japanese Patent Unexamined Publication No. 4-341133, because of the presence of the guides, the fibers are arranged in a generally meandering manner in the direction of the axis of the rod tube, or the flow of a resin of the prepreg becomes uneven. In the construction disclosed in the Japanese Utility Model Unexamined Publication No. 5-88259, the presence of the resin tape, likewise causes the fibers to be arranged in a generally meandering manner in the direction of the axis of the rod tube, and causes the flow of a resin of the prepreg to become uneven. As a result, the strength of the rod tube is reduced, and is liable to be broken.

Furthermore, the guides formed integrally on the inner surface of the rod tube exert a great influence on the strength of the rod tube when the rod tube is flexed, and the flexural strength of the rod tube is lowered by the concentration of stresses depending on the configuration, construction and material of the guides, which leads to a possibility that the rod tube is broken during the fishing operation. Namely, it is thought that in the conventional rod tubes, sufficient consideration has not been given to the details of the guides and those portions of the rod tubes in the vicinity of the guides.

Japanese Patent Unexamined Publication No. 1-304836 discloses an intra-line fishing rod having a spiral fishline guide provided therein. This construction, in which the continuous spiral fishline guide is provided within a rod tube, is simpler as compared with a construction in which a plurality of annular fishline guides are provided within a rod tube.

However, the spiral guide has an end portion, and when the fishline is to be passed through the rod tube, the fishline is caught by this end portion and often damaged, and even if the fishline is not damaged or cut, the resistance to the passage of the fishline is increased. In such a case, the fishline guide causes reduced efficiency and performance of the intra-line fishing rod.

In an intra-line fishing rod, a fishline is passed through a narrow bore or space in a rod tube, and generally the fishline moves in contact with an inner surface of the rod tube. Therefore, if the inner surface is coarse or rough, a frictional resistance to the fishline is increased, so that the fishline is damaged by increased frictional heat, and also the inner surface of the rod tube is susceptible to damage. If the inner surface is thus damaged, the fishline is damaged by it.

Japanese Patent Unexamined Publication No. 5-268858 discloses an intra-line fishing rod in which a resin layer containing fluoroplastic particles or a resin layer of ultra-high-molecular-weight polyethylene is formed on an inner surface of a rod tube so as to prevent a fishline from adhering to the inner surface of the rod tube and also to smoothly guide the fishline.

In the fishing rod disclosed in Japanese Patent Unexamined Publication No. 5-268858, a material, having a good water repellency and a low friction coefficient, is used, and therefore water drops hardly deposit on the inner surface of the rod tube, and the resistance to the fishline is not increased by water drops. However, even with the use of fluoroplastic particles having a low friction coefficient, if the inner surface of the rod tube is coarse, this inner surface still remains coarse even when a mixture of such fluoroplastic particles and a resin coating is coated onto the inner surface of the rod tube, and as a result the resistance to the passage of the fishline is increased as described above.

In the case where a film of ultra-high-molecular-weight polyethylene is wound on a metal core, and then is baked together with a prepreg, the inner surface of the resultant rod tube is coarse depending on a coarse surface of the metal core. As a result, the frictional resistance on the fishline passing through the rod is increased.

With regard to prior art methods for forming intra-line fishing rods, Japanese Patent Unexamined Publication No. 4-341133 discloses a method in which annular fishline guides each made of a monofilament of fibers, are formed integrally on an inner surface of a rod tube so as to enhance the sliding movement of the fishline and also to prevent the inner surface of the rod tube from being damaged by wear. More specifically, the monofilaments of fibers are wound on suitable portions of an outer peripheral surface of a mandrel, and then a prepreg is wound thereon to form the rod tube of an integral construction according to an ordinary method. There is also disclosed a method in which step portions are formed in a mandrel, and annular fishline guides are positioned at these step portions, respectively, and then a prepreg is wound thereon.

With this conventional method, however, the inner surfaces of the annular fishline guides are held in intimate contact with the surface of the mandrel, and therefore when the prepreg is wound thereon, the prepreg is radially outwardly convex in the vicinity of the annular fishline guides, and the other portions of the prepreg is held in contact with the mandrel along the surface of the mandrel. Namely, in the molding of the rod tube using the prepreg, the inner surface of the rod tube coincides with the inner surfaces of the annular fishline guides in the axial direction, and the annular fishline guides will not project from the inner surface of the rod tube. During the hot molding, resin flows from the prepreg into the surface of the mandrel, so that the annular fishline guides are embedded in the resin. As a result, the annular fishline guides are not exposed to the inner surface of the rod tube.

Even if the inner surface of the annular fishline guide is partly exposed, burrs of the resin are usually formed around the thus exposed portion. In this condition, if the fishline is guided through the rod, the fishline may be damaged by the burrs of the resin, thus the stable fishline guide function can not be performed.

Even in the case where the positioning step portions are provided on the mandrel, the annular fishline guides are similarly embedded in the resin since the monofilament of fibers has a relatively small diameter.

In addition to these problems, there is another problem that the prepreg is outwardly convex in the vicinity of the annular fishline guides as described above, so that the fibers meander, which reduces the strength of the rod tube.

The need therefore exists for an intra-line fishing rod and method for manufacturing the same which overcomes the drawbacks outlined above with regard to the prior art.

SUMMARY OF THE INVENTION

It is therefore an object of this invention to provide an intra-line fishing rod of a high strength in which a guide is projectingly formed integrally on an inner surface of a rod tube, and those portions of the rod tube in the vicinity of the guide are prevented from being reduced in strength.

To achieve this objective, the present invention provides an intra-line fishing rod wherein a rod tube comprises a synthetic resin as a matrix, and is reinforced by reinforced fibers; and a guide is formed integrally with and projects from an inner surface of the rod tube; characterized in that a cushioning portion is formed between the guide and a body layer of the rod tube which is composed predominantly of axially-extending fibers; and cushioning portions are formed respectively at front and rear sides of the guide connected to the inner surface of the rod tube; and the cushioning portions are smaller in bending modulus than a bulge portion region of the guide for contact with a fishline.

It is noted that the term "bending modulus" means a resistance force (rigidity) to the bending of the rod tube in a flexing direction per unit transverse area of the rod tube.

In the invention described above, the cushioning portions with a small bending modulus are formed respectively between the guide and the body layer and at the front and rear sides of the guide. Therefore, when the rod tube is flexed, the resistance due to the flexural rigidity of the guide is reduced, and the concentration of stresses on the rod tube is prevented, and the strength of the rod tube is increased.

The present invention also provides an intra-line fishing rod wherein a rod tube comprises a synthetic resin as a matrix, and is reinforced by reinforced fibers; and a guide is formed integrally with and projects from an inner surface of the rod tube; characterized in that the guide comprises a synthetic resin as a matrix; a bulge-portion region of the guide for contact with a fishline has a higher content of a reinforcement; and either synthetic resin regions or synthetic resin-reinforcement mixture regions having a higher synthetic resin content are provided respectively at front and rear sides of the bulge portion region and between the bulge portion region and a body layer of the rod tube having the fibers oriented generally in the direction of an axis of the rod tube.

In the present invention, with respect to the guide formed of FRP or the like, the bulge portion region contains a higher reinforcement content, and that portion between the bulge portion region and the body layer of the rod tube, as well as those portions disposed respectively at the front and rear sides of the bulge portion region, has a higher synthetic resin content. With this construction, the guide is connected to the rod tube at its low-rigidity portions lower in flexural rigidity than the bulge portion region. Therefore, when the rod tube is flexed, the resistance due to the flexural rigidity of the bulge portion region is reduced, and the concentration of stresses on the rod tube is prevented, and the strength of the rod tube is increased.

The invention further provides an intra-line fishing rod wherein a rod tube comprises a synthetic resin as a matrix, and is reinforced by reinforced fibers; and a guide is formed integrally with and projects from an inner surface of the rod tube; characterized in that the guide has an outer side surface extending generally along the inner surface of the rod tube disposed at the front and rear sides of the guide, and in that a number of the guides may be formed of a synthetic resin, and may be spaced at short intervals along a length of the rod tube.

With this arrangement, if the guide is formed of a synthetic resin, the area of contact of the guide with the fishline is not constant, although if only one guide is provided, the guide can be easily damaged by the frictional resistance developing between the guide and a fishline, and hence is susceptible to wear. However, if a number of guides are provided at short intervals at a small-diameter portion of the rod tube (as at the end portion adjacent to the tip top of the rod tube), the above wear can be prevented. And besides, since the guides are formed of the synthetic resin, they will not offer a large resistance to the flexing of the rod tube, and the concentration of stresses is prevented, and the strength of the rod tube is increased.

The present invention further provides an intra-line fishing rod wherein a rod tube comprises a synthetic resin as a matrix, and is reinforced by reinforced fibers; and a guide is formed integrally with and projects from an inner surface of the rod tube; characterized in that a curved surface of a bottom portion of the guide connected to the inner surface of the rod tube is defined by a concavely-curved surface which is gentler than a convexly-curved surface covering the top and a side surface of the guide.

With this arrangement, the guide is formed into a suitable configuration, and the bottom portion of the guide connected to the inner surface of the rod tube is defined by the concavely-curved surface which is gentler than the convexly-curved surface in the vicinity of bulge portion region. Therefore, the bottom portion of the guide portion is progressively decreasing in thickness, so that the concentration of stresses is reduced when the rod tube is flexed, and the strength of the rod tube is increased.

The invention also discloses an intra-line fishing rod wherein a rod tube comprises a synthetic resin as a matrix, and is reinforced by reinforced fibers; and a guide is formed integrally with and projects from an inner surface of the rod tube; characterized in that the guide spirally extends continuously; and a distal end portion of the guide is densely arranged in contact with the inner surface of an end portion of the rod tube over a predetermined length along an axis of the rod tube.

With this construction, the distal end portion of the spiral guide is densely arranged in contact with the inner surface of the end portion of the rod tube over a predetermined length along the axis of the rod tube. With this construction, even if stresses concentrate on the end portion of the rod tube in the vicinity of the guide, the end portion of the rod tube is prevented from damage since its strength is increased. For connection purposes, the end portion of the rod tube is originally designed to have a greater strength than the other portions, and this can be achieved by densely arranging the guide, and besides the fishline is prevented from being caught by the end of the guide.

It is also an object of this invention to provide an intraline fishing rod in which a fishline can be smoothly passed through a rod tube, and the fishline and the inner surface of the rod tube are hardly damaged.

To achieve the above object, the present invention provides an intra-line fishing rod characterized in that an inner surface of that region of a rod tube where a fishline guide is not provided, and a fishline is to be passed, or that surface of a fishline guide for contact with the fishline which fishline guide is formed on and projects from the inner surface of the rod tube, is formed into a mirror surface-like smooth surface.

The surface through which the fishline is to be passed, or the surface for contact with the fishline is formed into the mirror-like smooth surface. With this construction, the resistance to the passage of the fishline is reduced, and the friction is reduced, so that the fishline and the inner surface of the rod tube are less liable to damage. The term "mirror-like smooth surface" means a surface having surface roughness of not more than about $2\mu$, and preferably not more than about $1\mu$. Here, so-called undulations, waving at a larger pitch as compared with the surface roughness, are not taken into consideration.

It is further an object of this invention to provide a construction in which an end portion of a continuous guide is so treated as to prevent a fishline from damage and also to reduce passage resistance.

To achieve the above object, the present invention provides an intra-line fishing rod characterized in that an annular guide member is provided at an end of a continuous guide mounted within a rod tube. Examples of the continuous guide include a single spiral guide, a combination of spiral guides, and a guide structure having a plurality of annular guides interconnected by a wire member or the like in a longitudinal direction. The annular guide member can be formed by tightly winding the end portion of the continuous guide. The annular guide member can also be formed by a separate guide member connected to the continuous guide.

In this construction, the annular guide member is provided at the end of the continuous guide, and a fishline is guided by the annular guide member at the end of the continuous guide. Therefore, the fishline will not be caught by this end, and the resistance to the passage of the fishline is prevented from increasing.

The invention also provides an intra-line fishing rod in which the inner diameter of the annular guide member is smaller than the inner diameter of that portion of the continuous guide disposed adjacent to the annular guide member.

In this construction, the inner diameter of the annular guide member is smaller than the inner diameter of that portion of the continuous guide disposed adjacent to the annular guide member. Therefore, even when the fishline is shaken, the shaking is reduced by this annular guide member. As a result, the contact of the fishline with the inner surface of the rod tube is reduced, and the fishline is prevented from contacting water drops on this inner surface, and therefore the resistance to the passage of the fishline is reduced.

It is further an object of this invention to provide a method of producing a fishing rod, in which a fishline guide is stably exposed to an inner surface of a rod tube, while preventing the meandering of fibers, and a fishline can be smoothly guided, thus reducing the resistance to the passage of the fishline.

According to a first aspect of the invention to achieve this objective in which a fishline guide is stably exposed to an inner surface of a rod tube, while preventing the meandering of fibers, there is provided a method of producing an intra-line fishing rod having a rod tube which comprises a resin as a matrix, and is reinforced by reinforced fibers, a fishline being passed through the rod tube; the method being characterized by the steps of:

winding a thick winding member on a surface of a mandrel in such a manner that a gap for receiving a fishline guide member is formed between opposite side edges thereof;

covering the gap with a thin soft member;

providing the fishline guide member in and along the gap through the thin soft member;

winding a fiber-reinforced prepreg, impregnated with or containing the resin, on the mandrel over the fishline guide member, and applying heat and pressure to the prepreg to form the rod tube; and subsequently withdrawing the mandrel, and removing the thick winding member and the thin soft member.

In this first method of the invention, the thick winding member is wound on the mandrel in a manner to provide the gap for receiving the fishline guide member. The fishline guide member is thus provided in and along this gap, and the prepreg is wound over the fishline guide member, and is molded to form the rod tube having the fishline guide member projecting from the inner surface of the rod tube. In this method, the resin flows from the prepreg into clearances (in the above gap) between the fishline guide member and the side edges of the thick winding member, and when this resin is set, the fishline guide member is fixedly secured to the rod tube. However, the resin forms corners or angles on the surface of the fishline guide member, which leads to a possibility that the fishline is damaged or cut upon contact with such corners. Therefore, in this invention, the above gap is covered with the thin soft member, and the fishline guide is provided along the gap through this thin soft member. With this arrangement, the fishline guide member, covered by the resin flowed into the region around the fishline guide member, has such a cross-sectional shape that that surface of the fishline guide member projecting radially inwardly from the inner surface of the rod tube is smooth. As a result, the fishline guide member can guide the fishline smoothly. The winding member and the soft member can be easily removed after the mandrel is withdrawn.

According to a second aspect of the invention to achieve this objective in which a fishline guide is stably exposed to an inner surface of a rod tube, while preventing the meandering of fibers, there is provided a method of producing an intra-line fishing rod having a rod tube which comprises a resin as a matrix, and is reinforced by reinforced fibers, a fishline being passed through the rod tube; the method being characterized by the steps of:

winding a thick winding member on a surface of a mandrel in such a manner that opposite side edge portions thereof overlap each other;

covering a step portion, formed between the boundary between the overlapping portions and open portions of the winding member, with a thin soft member;

providing a fishline guide member in and along the step portion through the thin soft member;

winding a fiber-reinforced prepreg, impregnated with or containing the resin, on the mandrel over the fishline guide member, and applying heat and pressure to the prepreg to form the rod tube; and subsequently withdrawing the mandrel, and removing the thick winding member and the thin soft member.

In this second method of the invention, instead of the gap in the first method, there is utilized the step portion formed at the boundary between the overlapping portions and the open portions of the winding member, and this step portion is covered with the thin soft member, and the fishline guide member is provided in and along this step portion through the thin soft member, and the prepreg is wound thereon. By doing so, any corner is prevented from being formed. The other procedure is the same as that of the first method.

According to a third aspect of the invention to achieve this objective in which a fishline guide is stably exposed to an inner surface of a rod tube, while preventing the meandering of fibers, there is provided a method of producing an intra-line fishing rod having a rod tube which comprises a resin as a matrix, and is reinforced by reinforced fibers, a fishline being passed through the rod tube; the method being characterized by the steps of:

winding a winding member on a surface of a mandrel, the winding member having a groove formed in its surface for receiving a fishline guide member;

providing the fishline guide member in and along the groove;

winding a fiber-reinforced prepreg, impregnated with or containing the resin, on the mandrel over the fishline guide member, and applying heat and pressure to the prepreg to form the rod tube; and subsequently withdrawing the mandrel, and removing the winding member.

In this third method of the invention, the groove is formed in the winding member, and this winding member is wound on the mandrel, and then the fishing guide member is provided in and along this groove, and the prepreg is wound thereon, and the molding is effected. As a result, the fishline guide member is fixedly secured to the rod tube by the fluidized resin of the prepreg, and the fishline guide member stably projects from the inner surface of the rod tube.

If the groove has such a cross-section that the resin flowed into the groove forms corners, the groove is covered with a thin soft member much smaller than the depth of the groove as in the first and second method, and then the fishline guide is provided along the groove through this thin soft member. By doing so, any corner is not formed.

These and other advantages of the present invention will become apparent with reference to the following drawings and the detailed description thereof provided below.

DETAILED DESCRIPTION OF THE PREFERRED EMBODIMENT

A first preferred embodiment of the present invention will now be described in further detail with reference to the accompanying drawings.

Figure 1:
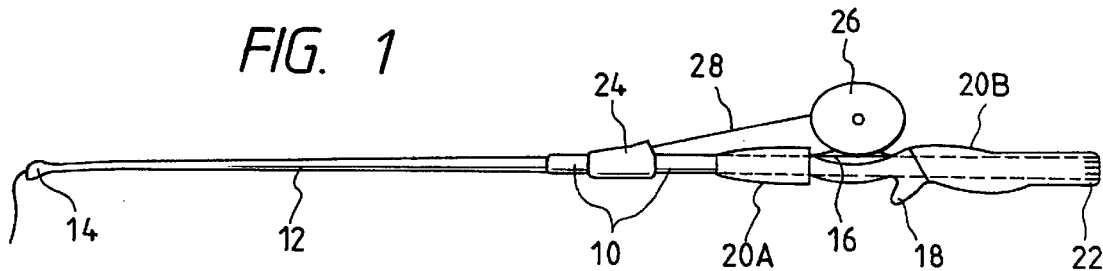
FIG. 1 is a side-elevational view of a first embodiment of an intra-line fishing rod according to the present invention.

FIG. 1 shows one preferred embodiment of an intra-line fishing rod of the. invention. A butt rod 10 and a tip rod 12 of a rod tube are formed or molded by winding and baking a fiber-reinforce prepreg (This term is used in a broad sense including a thermoplastic resin) which is formed by impregnating high-strength fibers of carbon or the like with a thermosetting resin (e.g. an epoxy resin) or by mixing a thermoplastic resin (e.g. polyamide) with such high-strength fibers. The butt rod 10 and the tip rod 12 are serially connected together. A reel-mounting portion 16 is provided on the butt rod 10, and a reel 26 of the double bearing type is mounted on this reel-mounting portion 16. A fishline 28 is inserted into the interior or bore of the rod tube through a fishline-introducing portion 24 provided at a front end portion of the butt rod 10, and is passed therethrough to the exterior through a top guide 14 provided at the top of the tip rod 12.

A front grip portion 20A is mounted on the butt rod 10 at the front side of the reel-mounting portion 16, and a rear grip portion 20B is mounted on the butt rod 10 at the rear side of the reel-mounting portion 16. A butt cap 22 is threadedly connected to the rear end of the butt rod 10. Reference numeral 18 denotes a trigger which receives an angler's finger during use.

Figure 2:
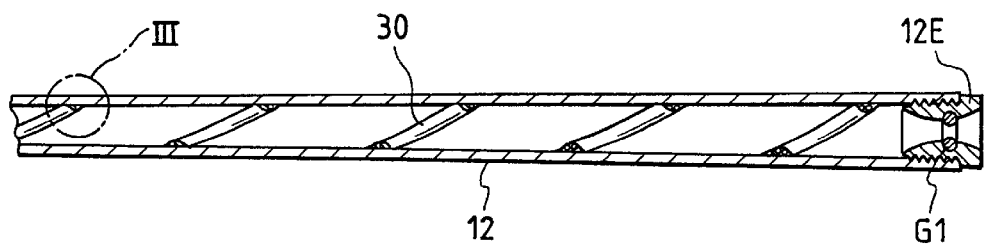
FIG. 2 is a longitudinal cross-sectional view of a portion, of the fishing rod of FIG. 1.
Figure 3:
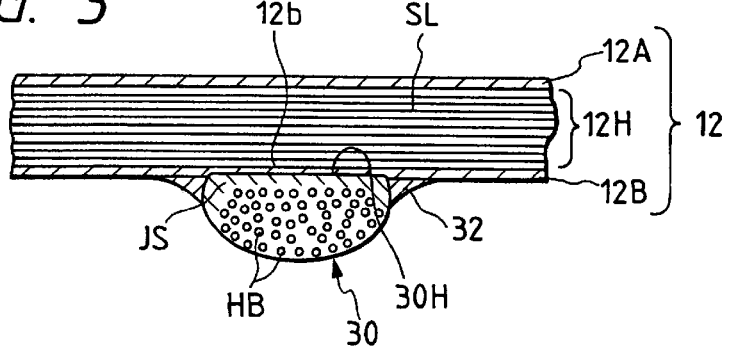
FIG. 3 is an enlarged view of a portion designated at III in FIG. 2.

FIG. 2 is a longitudinal cross-section of a rear portion of the tip rod 12, and FIG. 3 is an enlarged view of a portion of the tip rod designated at III in FIG. 2. A plug 12E of metal or a synthetic resin is threaded into the rear end of the tip rod, and a guide ring G1 of a ceramics material is fixedly mounted on an inner peripheral surface of the plug 12E. A spiral guide 30 is formed integrally on the inner peripheral surface of that portion of the rod tube 12 disposed forwardly of the plug 12E. The spiral guide is one example, and annular guides independent of one another may be provided on this inner peripheral surface at predetermined intervals. The spiral guide may wind in either of a right direction and a left direction, and right-spiral guides and left-spiral guides may be combined. The guide may be provided over the entire length of the rod tube 12, or may be provided at part of the rod tube 12.

The rod tube 12 has a pair of reinforcing layers 12A and 12B (in which the fibers are oriented generally in the circumferential direction) formed at its outer and inner peripheries, respectively, and the rod tube 12 also has a body layer 12H (in which the fibers are oriented generally in the axial or longitudinal direction) sandwiched between the two reinforcing layers 12A and 12B.

The guide 30 comprises a synthetic resin as a matrix, and a reinforcing material HB of carbon fibers, ceramics fibers, glass fibers or metal fibers which are oriented mainly in the longitudinal direction of the guide 30. The outer side or surface of the guide 30 is straight as at 30H in FIG. 3 which shows a transverse cross-section thereof. The reinforcing material HB is provided mainly at a bulge region of the guide 30 for contact with the fishline, and is hardly provided at the outer side of the guide. The outer side portion of the guide 30 and its front an rear portions are defined by a synthetic resin layer JS made predominantly of a synthetic resin.

The resin content in the region where the reinforcing material HB is provided is 30~60 wt. %, and this resin content is somewhat larger than the resin content of the rod tube. This facilitates the molding of the synthetic resin layer JS, and also prevents voids from developing in the inner surface of the guide 30. Further, cushioning portions 32 of a synthetic resin are provided at the front and rear sides of the guide 30, respectively, and connect the guide 30 to the inner surface of the rod tube 12, the cushioning portion 32 being decreasing in thickness progressively away from the guide 30. The guide 30 is formed integrally with the rod tube in such a manner that the outer side of the guide 30 is slightly embedded in the reinforcing layer 12B. Therefore, those portions or regions 12b of the reinforcing layer 12B facing the outer side of the guide is smaller in thickness than the other regions.

Generally, the reinforcing layer 12b, the reinforcing layer 12B adjacent to the guide, and the synthetic resin layer JS are smaller in bending modulus than the bulge region in which the reinforcing material HB is provided, and perform a cushioning function together with the cushioning portions 32, thereby preventing stresses from being concentrated when the rod tube is flexed. If the synthetic resin, forming the synthetic resin layer JS and the cushioning portions 32, is of the same type as the synthetic resin forming the rod tube 12 (that is, if the rod tube is made of an epoxy resin, then the synthetic resin layer JS and the cushioning portions 32 are made of an epoxy resin), the strength of the integral structure is increased.

If the resin used for the guide 30 is of the type (e.g. a thermoplastic resin) which will not melt at the temperature of hot molding of the rod tube, reinforced fibers SL of the body layer 12H, which are oriented mainly in the axial direction, are prevented from meandering at the time of integrally joining the guide 30 to the rod tube-forming prepreg, since the outer side 30H of the guide 30 is straight as described above. This increases the strength of the rod tube.

The strength of the rod tube of this embodiment at the time of bending is 15~20% higher as compared with a construction in which any cushioning region (similar to the cushioning regions 32), and an outer side of a guide is not straight but is outwardly convex.

Figure 4:
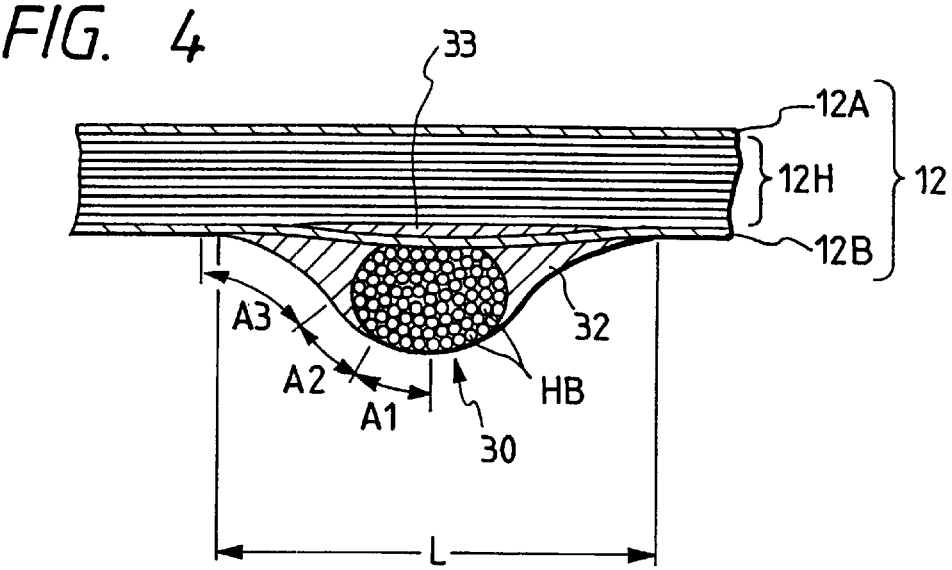
FIG. 4 is a longitudinal cross-sectional view similar to FIG. 3, but showing another embodiment.

FIG. 4 is a view similar to FIG. 3, but showing another preferred embodiment. A reinforcing material HB is distributed generally uniformly in a bulge region A1 (Although only a left half thereof is designated, a symmetrical right half is included) of a guide 30 for contact with the fishline and its inner portion, as described above. That portion of the guide containing the reinforcing material HB has a generally oval outer shape. In this embodiment, the other portions of the guide 30, that is, regions A2 and A3 (provided at the front and rear portions of the guide 30) and inner portions thereof, define cushioning portions 32 made of a synthetic resin. The area covering the region A1 to A2 is convex away from the inner surface of the rod tube to secure a certain width of contact with the fishline (Most of the contact region is defined by the region A1), and the region A3 is concave toward the inner surface of the rod tube, and is progressively decreasing in thickness. Preferably, the region A3 has the concave surface whose curvature is gentler than the average curvature of the area covering the regions A1 and A2, so that the width L of the guide 30 is increased, and also this is preferably more than about twice larger than the bulge region A1 (the right and left portions). A resin layer 33 serving as a cushioning layer is disposed outwardly of the guide 30, and is formed between a body layer 12H and a reinforcing layer 12B. Therefore, the concentration of stresses are prevented when the rod tube is flexed.

In one method of integrally molding the guide 30, a number of fibers of the reinforcing material are combined together into a bundle, and this bundle is impregnated with a thermosetting resin, and then twisting is imparted to the bundle. As a result, during the hot molding, the resin melts and oozes out to form the cushioning portions 32 respectively at the front and rear sides of the guide 30.

Figure 5:
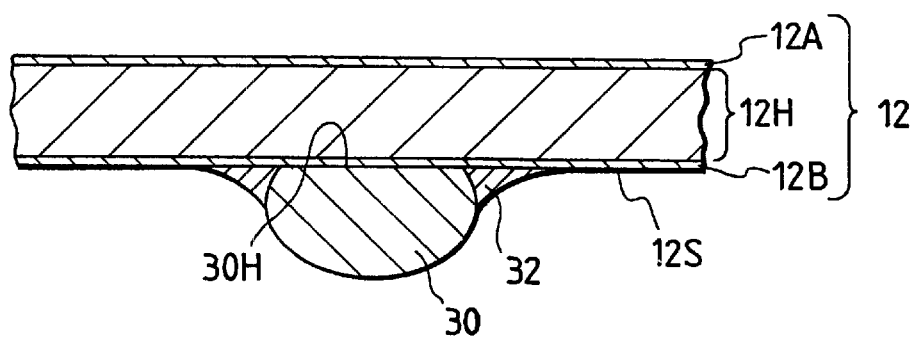
FIG. 5 is a longitudinal cross-sectional view similar to FIG. 3, but showing a further embodiment.

FIG. 5 shows a guide 30 formed by a material which will not melt during hot molding, such as a ceramics material, a metal material, a heat-resistant resin material and a heat-resistant composite material. An outer side or surface 30H of the guide 30 is straight, and is generally along an inner surface 12S of an inner reinforcing layer 12B of a rod tube 12. Cushioning portions 32, connecting the guide 30 to the rod tube, are provided at front and rear sides of the guide 30, respectively. These cushioning portions are formed by adding a small amount of a reinforcement to a synthetic resin. With this construction, the concentration of stresses is prevented when the rod tube is flexed. Since the outer side of the guide is straight, axially-extending fibers of a body layer 12H are prevented from meandering, and therefore the strength of the rod tube is increased.

In the case of the guide 30 formed by the above heat-resistant synthetic resin, a number of guides 30 need to be spaced at short intervals along the rod tube so as to prevent the guide from being rubbed hard by the fishline, thus preventing part of the guide from being excessively worn.

In this and other embodiments, the provision of the reinforcing layers 12A and 12B may be omitted, in which case a layer of generally circumferentially-oriented fibers or a cloth in which some of fibers are oriented in the circumferential direction is usually included in the body layer 12H.

Figure 6:
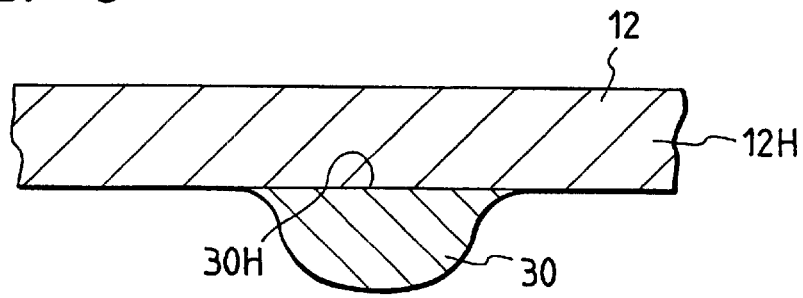
FIG. 6 is a longitudinal cross-sectional view similar to FIG. 3, but showing a still further embodiment.

FIG. 6 shows a guide 30 formed by a resin (e.g. a thermosetting resin) which melts at the temperature of hot molding of a rod tube 12 composed of a body layer. Preferably, an outer side or surface 30H of the guide 30 is straight so as to prevent axially-extending fibers of the rod tube from meandering. As described above, the guide 30 of the resin is liable to wear, and the guides 30 are spaced at short intervals along the rod tube (In the case of the spiral guide, the distance between the adjacent turns thereof is short). In that region closer to the tip rod, a larger flexure must be secured, and therefore the guide of the synthetic resin with a low flexural rigidity is preferably applied to such a region closer to the tip top. This portion of the rod tube is so designed that it is easily flexed for relieving purposes upon reception of a large load from the fishline, and therefore this portion is not so hard rubbed by the fishline as that portion of the fishing rod near to fishline-introducing portion, so that even the guide of the synthetic resin can smoothly guide the fishline. Thus, the guide 30 of the synthetic resin formed integrally with the rod tube 12 will not offer a large resistance to the flexing of the rod tube, and the concentration of stresses is prevented. Wear-resistant grains may be added in such an amount that the flexural rigidity is not adversely affected. The guide 30 may be formed utilizing the synthetic resin used in the prepreg for the rod tube 12.

Figure 7:
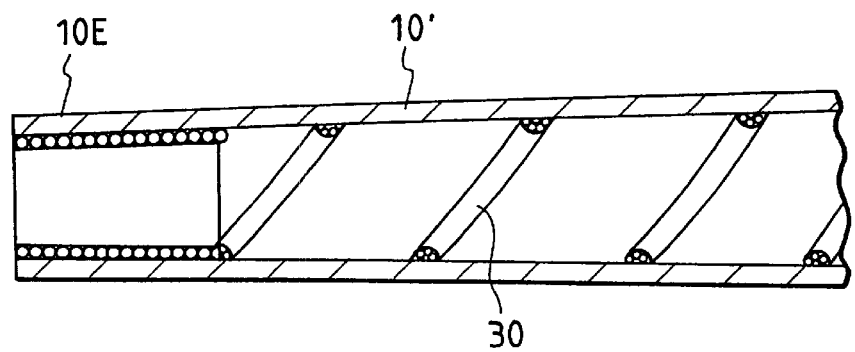
FIG. 7 is a longitudinal cross-sectional view of a portion of a further embodiment of an intra-line fishing rod of the invention.

FIG. 7 shows a spiral guide 30 formed by a bundle of carbon fibers or the like. The guide 30 is formed on a rod tube 10' in a bulged manner, and a distal end portion of the guide 30 is wound tightly or densely over a predetermined length of a front end portion (used for connection) of the rod tube, thereby reinforcing this front end portion. The distal end portion of the guide 30 may be wound either as it is or with the fibers thereof disintegrated. Preferably, the inner surface of the wound portion is tapering forwardly in the telescopic type, and is straight in the serially-connected type. Thus, the end portion of the rod tube (particularly, the joint end portion) which should originally be reinforce can be reinforced utilizing the spiral guide, so that the rod tube of a greater strength can be provided. The fishline may be caught by the end portion of the spiral guide 30 if this end portion is not suitably treated, and in such a case the resistance to the fishline may be increased, and the end portion of the guide 30 may be damaged. However, with the above treatment, the fishline is prevented from being caught, and the durability of the guide is enhanced. This reinforcement can, of course, be achieved using any other suitable material such as a prepreg sheet and a tape, or the above method and such a reinforcing method can be used in combination.

Figure 8:
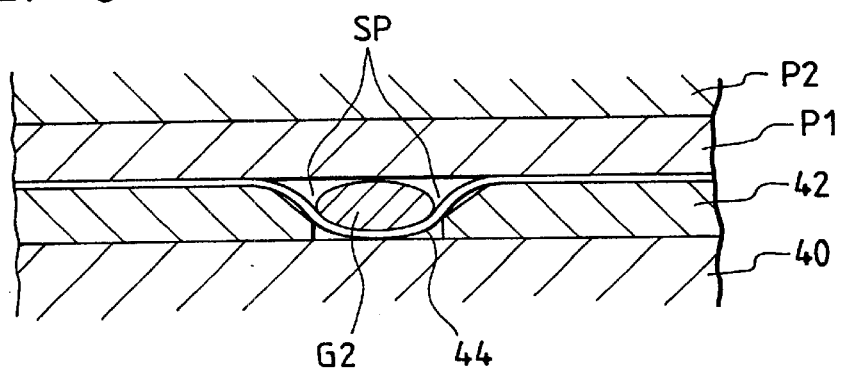
FIG. 8 is a view showing one method of producing an intra-line fishing rod of the invention.

FIG. 8 is a view explanatory of one method of producing an intra-line fishing rod of the present invention. A tape 42 of a predetermined thickness is wound on a surface of a metal core 40 at predetermined intervals, and then a thin film 44 of polyethylene naphthalate (PEN) or polyethylene terephthalate (PET) which withstands a heating temperature is provided over the tape 42, and then a spiral guide G2 is windingly provided in a space formed by the wound tape 42. At this time, the thickness of the guide G2 and the thickness of the tape 42 are so determined that the outer side or surface of the guide 30 will generally contact an inner surface of a prepreg P1 (which constitutes a rod tube) to be wound on the outer surface.

When heating the above assembly while applying a pressure, a synthetic resin in the prepregs P1 and P2 flow into gaps SP to form cushioning portions. The synthetic resin thus flows into the gaps SP, and therefore usually burrs are formed at the front and rear sides of the guide G2. However, because of the presence of the thin film 44, the formation of such burrs is prevented. In the case where this film 44 is not used, the tap 42 is so wound that the edges thereof can firmly contact the opposite sides of the guide G2, thereby preventing the formation of burrs. Even when the tape 44 is used, it is preferred from the viewpoint of burr prevention that the molding is effected with the guide firmly held by the tape 42.

In another method, the guide can be formed utilizing the constituent material of the rod tube. More specifically, when a reinforcing layer 12B as shown in FIG. 3 is to be formed on an inner surface of a rod tube, this inner reinforcing layer is formed not by a sheet-like prepreg but by a tape-like prepreg smaller in width than such a sheet. In order that a guide protuberance can be formed on an inner surface of the rod tube, a tube of silicone or the like, having a spiral groove or independent annular grooves formed on an outer periphery thereof, is fitted on a metal core, or a heat-resistant resin tape is, for example, spirally wound on the metal core. Then, the above-mentioned tape-like prepreg is wound on the tube or the tape to form the inner reinforcing layer 12B and the guide protuberance integrally with each other. Then, this assembly is baked according to a conventional method, and finally the tube or the resin tape is removed. In this method, the guide can be easily formed, and also in the tape-like prepreg, reinforced fibers can be arranged very long along the length of the tape in a generally continuous manner, and therefore in the formed guide, the reinforced fibers corresponding to the above reinforcement are generally continuous, so that the guide of a high strength is provided.

The body layer in the tip rod (rod tube) can be formed by the material smaller in modulus of longitudinal elasticity as compared with the body layer in the butt rod or the intermediate portion of the fishing rod, so that the flexural rigidity of the tip rod can be smaller. In the case of the intra-line fishing rod, the inner diameter of the tip rod can not be made so small in connection with its relation with the outer diameter of the fishline to be passed therethrough. Even in such a case, the tip portion can be flexible.

As is clear from the above description, according to the present invention, there can be provided the intra-line fishing rod in which the rod tube has the guide formed integrally with and projecting from the inner surface thereof, and the rod tube is prevented from being reduced in strength at those portions thereof where the guide is provided.

A further embodiment of the present invention will now be described in further detail with reference to FIGS. 9–11.

Figure 9:
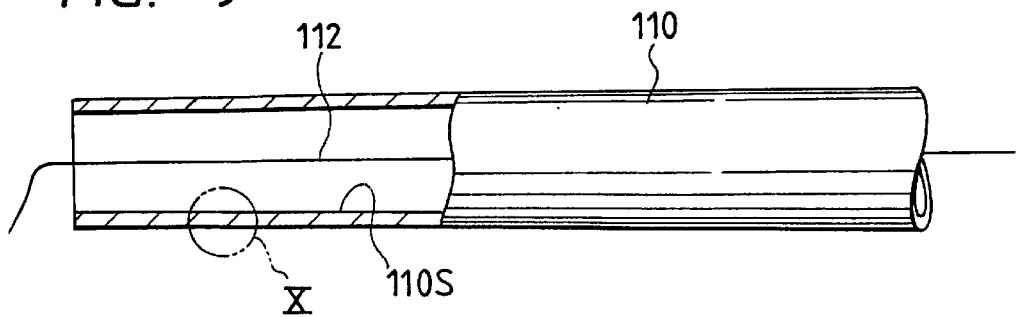
FIG. 9 is a partly longitudinal cross-sectional view of a portion of a rod tube of an intra-line fishing rod of the invention according to a second embodiment.

FIG. 9 is a partly longitudinal cross-sectional view of a portion of a rod tube 110 according to a second embodiment of the invention. FIG. 10 is an enlarged view of a portion designated at X in FIG. 9. The rod tube 110 comprises a rod tube body 110H composed of a prepreg formed by impregnating reinforced fibers (e.g. carbon fibers or glass fibers) with an epoxy resin or the like. A coating layer 110E is formed on an outer surface of the rod tube body 110H, and a very thin coating layer 110A of a synthetic resin, metal or ceramics is formed on an inner surface of the rod tube body 110H. Thanks to the provision of the very thin coating layer 110A, the inner surface of the rod tube is prevented from being scratched by a rough surface of a metal core when the baked rod tube is removed from the metal core, thereby preventing the reinforced fibers from damage.

The rod tube body 110H is composed of three layers, that is, an intermediate layer 110C having the reinforced fibers oriented generally in the axial or longitudinal direction, and inner and outer layers 110B and 110D (which have the reinforced fibers oriented generally in the circumferential direction) formed respectively on the inner and outer surfaces of the intermediate layer 110C. This construction ensures a flexural rigidity of the rod tube, and also increases the strength of the rod tube to withstand impact to the rod tube.

Figure 11:
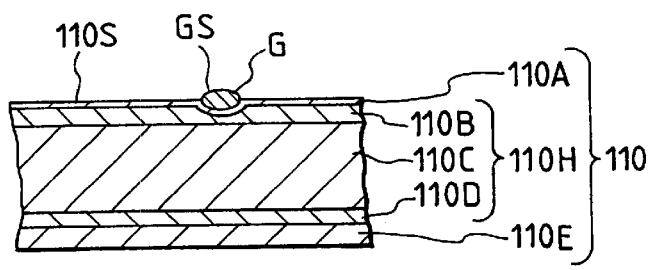
FIG. 11 is a view similar to FIG. 10, and more specifically a longitudinal cross-sectional view of an important portion of an intra-line fishing rod according to a further embodiment of the invention.

For this embodiment, a fishline guide G as shown in FIG. 11 is not provided on an inner surface 110 of the very thin coating layer 110A at the rod tube 110 or a front region of the rod tube 110, and a fishline 112 contacts the inner surface 110 of the rod tube. Therefore, the inner surface 110S of the rod tube is formed into a mirror-like smooth surface in order to reduce a resistance of contact of the fishline and also to allow water drops to easily move upon contact of the fishline with the inner surface having the water drops deposited thereon, thereby reducing the resistance to the fishline.

In the case where the very thin coating layer 110 is made not of a mixture material but of a synthetic resin, a resin film is wound on a metal core so as to be disposed inwardly of the prepreg, and the metal core is removed after baking, and then the inner surface of the rod tube is polished into a mirror-like smooth surface by buffing, by applying vibrations to the rod tube after an abrasive material is introduced into the rod tube material, or by spraying a mixture of an abrasive material and the air or other liquid onto the inner surface of the rod tube material (In the latter two methods, the mirror surface-like smooth surface is formed by the relative motion between the abrasive material and the inner surface of the rod tube).

In the case where the very thin coating layer 110A is composed of metal or ceramics, a mirror-like thin film is formed by vapor deposition or the like on a film-like base having a mirror-like flat, smooth surface, and then this is wound on the metal core to be disposed inwardly of the prepreg. The metal core is removed after baking, and the rod tube having the mirror-like smooth surface is obtained. Of course, the mirror-like smooth surface can be obtained by polishing as described above. Metal and ceramics are harder than the synthetic resin, and has a wear resistance, and therefore are suited for forming the inner surface of the intra-line fishing rod through which the fishline is passed in contact with the inner surface.

There may be used other method in which with respect to the finish surface roughness of the metal core, the surface of the metal core is finished into a mirror-like smooth surface with four triangular marks, and then the rod tube material is removed after baking, so that the inner surface of the rod tube is formed into a mirror-like smooth surface. In the conventional finish of the metal core surface, the finish working has been effected with two or three triangular marks, and the surface roughness has been 10~5$\mu$. In order to obtain the finish of not more than 2$\mu$ and preferably 1~0.2$\mu$, the finish polishing with four triangular marks (the surface roughness is not more than about 0.8$\mu$) should be effected. This surface roughness is determined using the maximum height (indicated in JIS) as a reference, but the average roughness may be used if the measurement is easier.

In the case where the inner surface layer of the rod tube is composed of a composite material (such as FRP which is reinforced by reinforced fibers, and comprises a resin as a matrix, or FRM which is reinforced by reinforced fibers, and comprises metal as a matrix), or where the inner surface of the rod tube is composed of a mixture resin layer containing ceramics particles, fluoroplastic particles or metal particles, the metal core is finished into a surface with four triangular marks as described above, and then the rod tube is removed after baking, so that the mirror surface-like smooth surface can be obtained.

In the case of FRM, the matrix is the relatively hard metal, and therefore the surface can be formed by the above polishing into the mirror surface-like smooth surface after molding. In the case where the composite material (e.g. FRM) having the hard matrix constitutes the inner surface layer of the rod tube, wear by the fishline is prevented, and as a result damage to the fishline is prevented, and also the resistance to the fishline is reduced.

The mirror-like smooth surface can also be formed on the inner surface of the rod tube by a method in which a resin film, having such a high melting temperature that it will not melt at a baking temperature of the prepreg, is preformed into a mirror surface-like smooth surface, and then it is baked together with the prepreg.

In the case of the mixture resin film containing ceramics particles, fluoroplastic particles or metal particles, the mirror surface-like smooth surface can be formed on the inner surface of the rod tube by a method in which the metal core is formed into a mirror surface-like smooth surface as described above, and then the resin film is wound so as to be dispose inwardly of the prepreg, and then the baking is effected. In the case of using the matrix resin having such a high melting temperature that it will not melt at a baking temperature of the prepreg, even if the metal core does not have a mirror surface, the mirror surface-like smooth surface can be formed on the inner surface of the rod tube by a method in which the mixture resin film is preformed into a mirror surface-like smooth surface, and then the resin film is baked together with the prepreg.

A fluoroplastic resin, such as a polymer of ethylene chloride trifluoride or ethylene chloride tetrafluoride, can be formed on the above mirror surface-like inner surface to thereby form a water-repellent surface in which the angle of contact of a waterdrop is not less than 110 degrees. Conversely, an aluminum oxide surface layer can be formed on the inner surface, or a surface active agent can be applied to the inner surface, thereby imparting a hydrophilic property to the inner surface in which the contact angle is not more than 80 degrees. With these arrangements, the resistance to the fishline is further reduced. Namely, most of the resistance of the water drops to the fishline is applied when the fishline comes into and out of the interface between the water drops and the air. Water drops hardly deposit on the water-repellent surface, and even if the water drops deposit on such a surface, they move together with the fishline, so that the resistance to the fishline is small. Water drops are liable to be continuous with one anther on the hydrophilic surface to form a film of water thereon, so that the fishline is less liable to come into and out of the interface between the water drops and the air, and the fishline moves in the water film, so that the resistance to the fishline is reduced.

Figure 10:
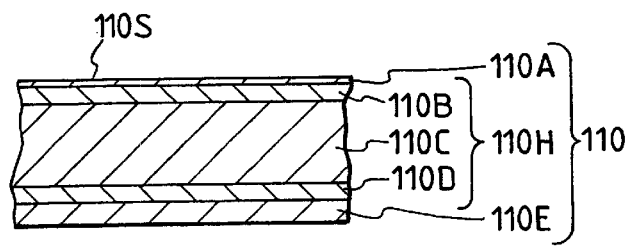
FIG. 10 is an enlarged view of a portion designated at X in FIG. 9.

FIG. 11 shows another embodiment of the invention, and is an enlarged view similar to FIG. 10. In this embodiment, a spiral fishline guide G or ring-shaped fishline guides G are projectingly formed on an inner surface of a rod tube. An inner surface GS of the fishline guide G for contact with a fishline is finished into a mirror surface-like smooth surface. An inner surface 110S of a very thin coating layer 110A is also finished into a mirror-like smooth surface. The fishline not only contacts the fishline guide G but also sometimes contacts the very thin coating layer 110A. Therefore, the very thin coating layer 110A is finished into the mirror-like smooth surface so as to further reduce the resistance to the fishline. However, this embodiment may be of such an arrangement that only the inner surface GS of the fishline guide G need to be finished into the mirror surface-like smooth surface.

For producing the rod tube having the fishline guide (or guides) G, a tube of a deformable material (e.g. silicone) with a spiral groove (or ring-shaped grooves) of a generally U-shaped cross-section is fitted on a metal core, and an elongate prepreg, having reinforced fibers (e.g. carbon fibers) oriented mainly in a longitudinal direction, is provided along this groove, and then a very thin film of a synthetic resin is wound thereon, and further a prepreg for forming the rod tube is wound thereon, and then this assembly is pressurized and baked. Then, the metal core is removed, and the tube of the deformable material (e.g. silicone) is deformed and removed. As a result, there is provided the rod tube having the fishline guide (guides) formed on and projecting from the inner surface thereof. In this case, the outer surface of the deformable tube, as well as the inner surface of the groove, is beforehand finished into a mirror surface-like surface, and with this method the mirror-like smooth surfaces GS and 110S are automatically formed simultaneously with the molding of the rod tube.

When the fishline is passed through the rod tube in which its surface of contact with the fishline has thus been finished into the mirror-like smooth surface, the contact resistance for the fishline is small, and the resistance offered by water drops is small, and the friction is small. Therefore, the fishline and the inner surface of the rod tube are hardly damaged. In the above embodiments, the provision of the very thin coating layer 110A may be omitted. The rod tube body 110H may has any other suitable construction.

The above-mentioned mirror-like smooth surface can be applied to an inner surface of other ordinary fishing rods other than the intra-line fishing rod, and also can be applied to an outer surface of any type of fishing rod. Dirt or stain is less liable to deposit on such a mirror-like smooth surface, and even if dirt deposits on the surface, it can easily removed. Therefore, this surface is clean, and a residual offensive smell due to dirt is eliminated, and the cause of cracks in the rod tube is eliminated, and therefore there can be provided the fishing rod of a high strength.

As is evidenced by the above description, in this further embodiment of the present invention, the surface for contact with the fishline is formed into the mirror-like smooth surface. Therefore, the frictional resistance upon contact with the fishline is reduced, and even if the fishline contact the surface having water drops deposited thereon, the water drops are easily moved, so that the influence on the resistance to the fishline can be reduced. And besides, since the frictional resistance is small, rubbing will not develop, and frictional heat is small. Therefore, there can be provided the intra-line fishing rod in which the fishline and the inner surface of the rod tube are hardly damaged.

A further element of the present invention will now be described in further detail with reference to FIGS. 1–21.

Figure 12:
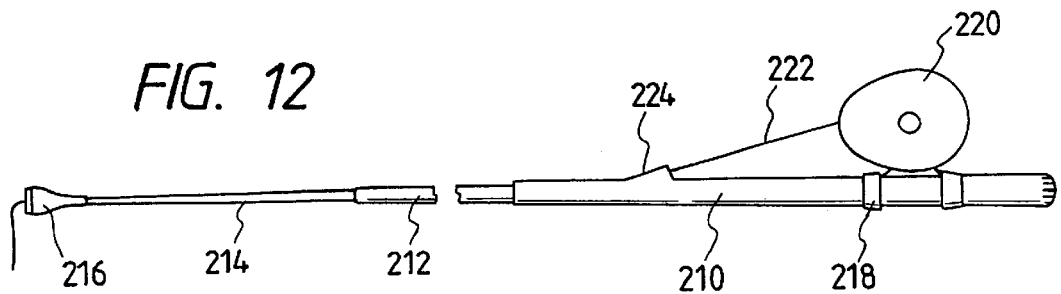
FIG. 12 is a side-elevational view of an intra-line fishing rod illustrating a further embodiment of the present invention.

FIG. 12 shows an intra-line fishing rod of the invention. An intermediate rod 212 is connected to a butt rod 210, and a tip rod 214 is connected to the intermediate rod 212. A top guide 216 is mounted on the tip top of the fishing rod. A reel-mounting device 218 is mounted on the butt rod 210, and a reel 220 is fixedly mounted on this device 218. A fishline-introducing portion 224 for introducing a fishline 222 into the fishing rod is provided at a front portion of the butt rod 210. The fishline 222 is introduced into the interior of a rod tube through this introducing portion, and is passed through the front portion of the butt rod, the intermediate rod and the tip rod, and is extended to the exterior through the top guide 216 at the tip top.

Figure 13:
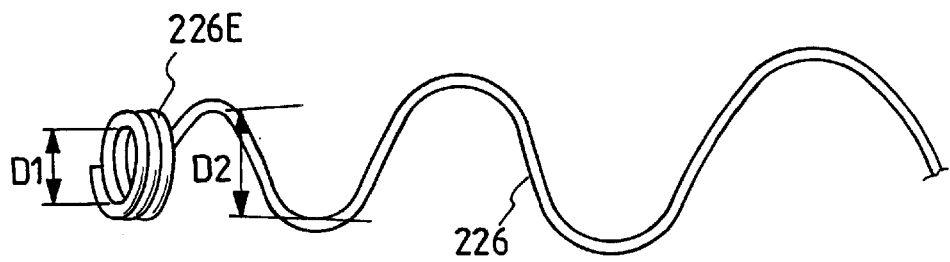
FIG. 13 is a view showing a front end portion of a spiral guide mounted within a rod tube of FIG. 12.

In order to prevent the increase of the passage resistance due to the frictional resistance caused upon contact of the fishline 222 with the inner surface of the rod tube, and also to prevent the increase of the passage resistance due to contact of the fishline with water drops depositing on the inner surface, one spiral guide 226 (an example of a continuous guide) is provided within the rod tube as shown in FIG. 13, or a plurality of spiral guides twisted in the same direction are provided within the rod tube, or a braid-like tube, composed of a pair of oppositely-twisted continuous guides, is inserted into the rod tube, or a guide member, having separate annular guide rings interconnected in a longitudinal direction by a bar-like member or the like, is inserted into the intermediate rod 212 or other rod, and is held or fixed. In order that the guide can be inserted and held, the size of the continuous guide is so determined that the outer periphery thereof can be held in contact with the inner surface of the rod tube. It is preferred from the viewpoint of maintenance of the guide that the guide can be removably inserted into and held by the rod tube.

For example, the front end portion of the spiral guide (continuous guide) 226 is wound tightly or densely to form an annular guide member 226E as shown in FIG. 13. This construction overcomes a disadvantage of the prior art in that the fishline becomes caught by this front end portion when the fishline is passed through the rod tube, and therefore the fishline can be smoothly passed through the rod tube with the construction of this invention. In this case, the inner diameter D1 of the annular guide member 226E is smaller than the inner diameter D2 of that portion of the spiral guide 226 disposed adjacent to this annular guide member 226E. When letting out the fishline as during casting, the fishline is usually passed through the rod tube while being shaken, and the fishline shaking within the rod tube contacts the inner surface thereof, and hence contacts water drops deposited on the inner surface, so that the resistance to the passage of the fishline is particularly increased. However, if the passage bore is constricted by providing the annular guide member 226E, the fishline is less liable to contact the inner surface of the rod tube, and therefore the passage resistance is reduced. The annular guide member 226E shown in FIG. 13 is provided when the spiral guide 226 is made of metal. However, if the spiral guide is formed by a prepreg or the like, the annular guide member (which is provided at the front end portion), formed by a tightly-wound wire element, can be formed into a unitary tubular configuration.

The pitch of the spiral winding is at least three times larger than the inner diameter of the rod tube, and is abut 10~50 mm depending on the inner diameter. Thus, the angle of the spiral winding is 45 degrees or more (that is, an angle approaching the longitudinal direction of the rod tube), thereby preventing the spiral guide from being deformed and damaged by the friction between the spiral guide and the fishline. In view of the strength and height of the spiral guide, the diameter of the wire element of the spiral guide 226 is preferably about 0.5~2 mm.

With respect to the spiral configuration, the loop portions of the spiral guide may be not so extended in the longitudinal direction as in the above-mentioned guide having the separated annular guide rings interconnected by the bar-like member in the longitudinal direction, and that portion of the spiral guide interconnecting any two adjacent loop portions may be extended in the longitudinal direction.

This spiral guide 226 may be inserted directly into the rod tube, or may be formed directly on the inner surface of the rod tube. Alternatively, the spiral guide 226 may be inserted into or formed on a cylindrical tubular member which is made of a prepreg, a synthetic resin or the like, and is inserted into the rod tube. These arrangements can be also applied to constructions shown in FIGS. 14 and 16, and an annular guide member (component part) 226E' or other shown in FIGS. 14 and 16 may be formed integrally with the inner surface of the tubular member. Namely, the annular guide member can be formed on the inner surface of the front end portion of the tubular member, and a guide unit of the cartridge type having a spiral portion can be provided on the inner surface of the other portion.

Figure 14:
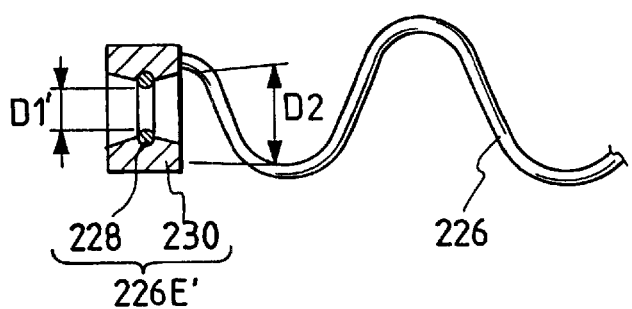
FIG. 14 is a view showing a front end portion of a spiral guide replacing that of FIG. 13.

In FIG. 14, the annular guide member (component part) 226E' is attached to a front end of a spiral guide 226. This annular guide member may be fixedly or releasably attached to the spiral guide as described later with reference to FIG. 16. This annular guide member comprises a holder 230 of a synthetic resin, and a guide ring 228 of ceramics held on the inner periphery of the holder 230. In this case, also, the inner diameter D1' of the annular guide member is preferably smaller than the inner diameter D2 of the spiral guide. A longitudinally-extending slit may be formed in the outer periphery of the holder 230 of the annular guide member 226E', and with this slit, when the spiral guide 226 is inserted into the rod tube, the holder is slightly contracted radially inwardly, and the holder is held on the inner surface of the rod tube because of its radially-expanding effect, so that the spiral guide 226 is prevented from being easily moved.

Figure 15:
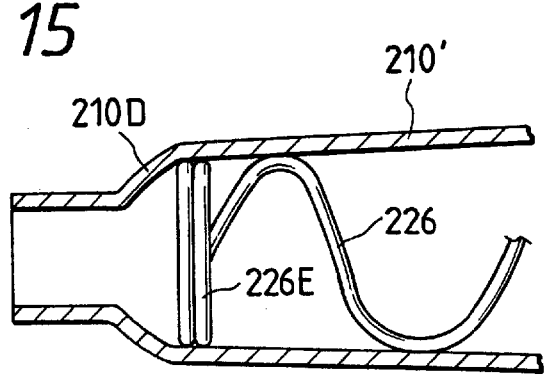
FIG. 15 is a view showing a mechanism for positioning the inserted spiral guide of FIG. 13.

In FIG. 15, a rod tube 210' having a step portion 210D is provided, and the annular guide member 226E at the front end of the continuous guide 226 is held against the step portion 210D, thereby positioning and holding the spiral guide.

Figure 16:
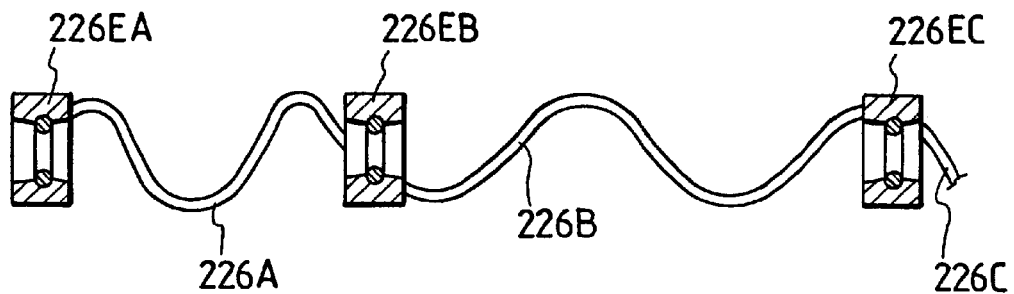
FIG. 16 is a view showing a modified spiral guide.

In FIG. 16, a continuous guide has an annular guide member 226E at its front end, and also has similar annular guide members 226EB and 226EC provided intermediate the opposite ends thereof. The spiral guide is divided into guide elements 226A, 226B and 226C, and these guide elements are interconnected through the annular guide members 226EB and 226EC to form the continuous guide. In this embodiment, the guide elements and the annular guide members may be completely fixedly connected together, or a cylindrical member may be fixedly secured to the end of each guide element, in which case this cylindrical member is releasably threaded on the outer periphery of the annular guide member. In another alternative, the end portion of the guide element may be wound into an annular configuration, in which case this annular portion is press-fitted on the outer periphery of the annular guide member, or the end of the guide element may be press-fitted into a recess formed in the annular guide member. In this case, also, if the inner diameter of each annular guide member is smaller than the inner diameter of the guide element, the fishline is less liable to contact the inner surface of the rod tube and the guide element, so that the resistance to the letting-out of the fishline is reduced. In this case, even if the guide element is not formed of a wear-resistant material such as ceramics, wear of the guide element is reduced if a ring or the like of a wear-resistant material is provided on the inner surface of the annular guide member, and the lifetime is prolonged.

In the case where the above continuous guides are formed by a prepreg formed by impregnating a bundle or a woven fabric of fibers (e.g. metal fibers, synthetic resin fibers or carbon fibers) with a synthetic resin such as an epoxy resin, a wear-resistant material such as ceramics may be coated onto the inner surface of the continuous guide for guiding the fishline 222 so as to smoothly guide the fishline. With respect to the prepreg, the fibers are more oriented in the direction of movement of the fishline in the fiber bundle than in the woven fabric, and therefore with the prepreg of the fiber bundle, the fishline can be guided more smoothly. Preferably, in order to prevent noises from being produced when operating the fishing rod, a noise prevention film is formed by bonding or the like on that surface of the continuous guide which contacts the inner surface of the rod tube when the continuous guide is inserted and held in the rod tube.

In the case where the spiral guide is formed of a synthetic resin or by a prepreg formed by baking, the end portion of the spiral guide is liable to be damaged upon reception of a force from the fishline. In this case, if the end portion is reinforced by a reinforcing material such as stainless steel, this end portion can be prevented from damage without the annular guide member as shown in FIGS. 13 or 14; however, it is preferred that the annular guide member is provided in order to effect the smooth passage of the fishline. If a reinforcing member is provided along the entire length of the spiral guide, or is provided within the spiral guide, not only the end portion but also the other portion (that is, the whole) have the stable strength.

Figure 17:
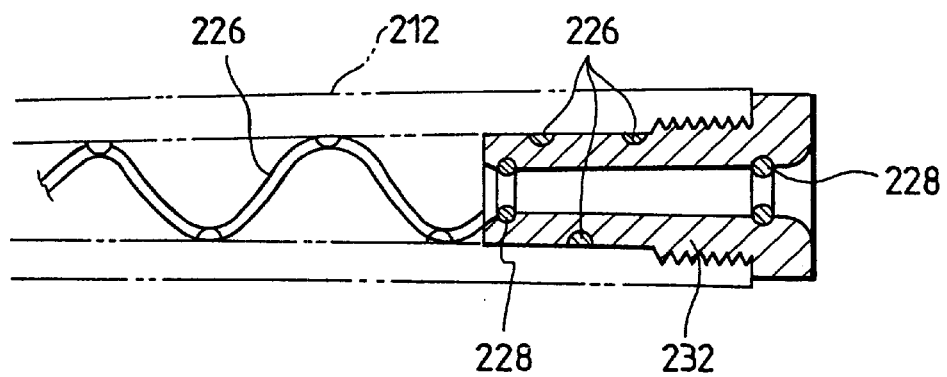
FIG. 17 is a view showing a rear end portion of a spiral guide.

FIG. 17 is a further embodiment of an annular guide member of the invention provided at the end of the spiral guide. The annular guide member is provided at the rear end of the spiral guide 226, and this annular guide member is in the form of a plug 232 of a synthetic resin having guide rings 228 of ceramics mounted therein and disposed respectively at front and rear portions thereof. In this embodiment, the plug 232 also serves as a butt plug, and is adapted to be threaded into a rear end of an intermediate rod 212. The rear end portion of the spiral guide 226 is received in a spiral groove formed in the outer peripheral surface of the plug 232, and is fixed thereto by an adhesive or the like. Thus, the rear end portion of the spiral guide 226 is equal in outer diameter to the plug 232. The inner diameter of the guide ring 228 is smaller than the inner diameter of the spiral guide 226, and a similar effect as described above for the front end is achieved.

Figure 18:
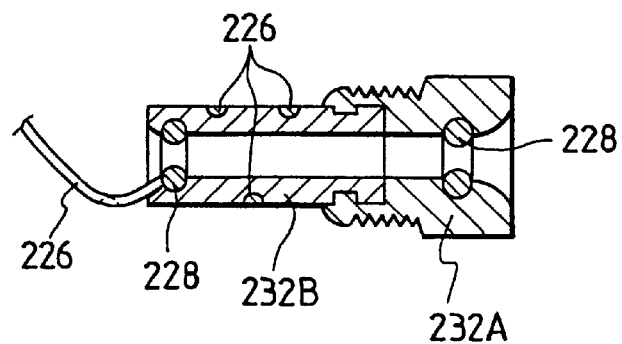
FIG. 18 is a view of a rear end portion of a spiral guide replacing that of FIG. 17.

FIG. 18 shows an assembly replacing the plug 232 of FIG. 17, and this assembly comprises a rear portion 232 and a front portion 232B. The front portion 232B is rotatable relative to the rear portion 232A.

Figure 19:
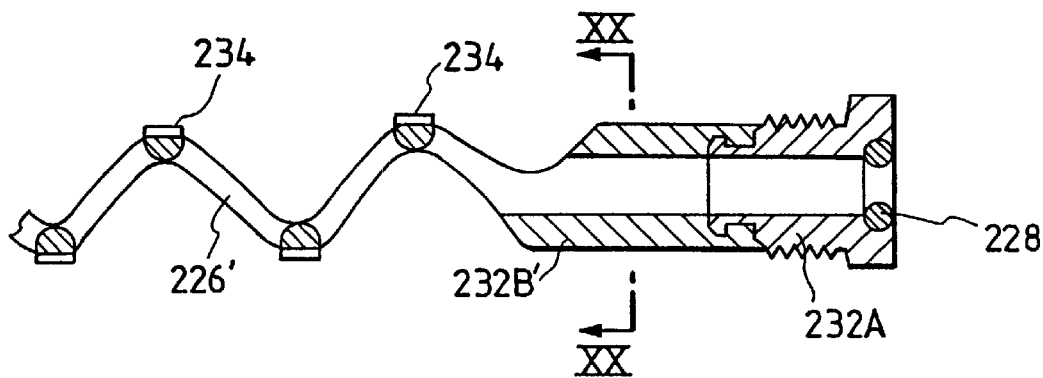
FIG. 19 is a view showing a rear end portion of a modified spiral guide.

FIG. 19 shows an arrangement in which the front portion 232B and the spiral guide 226 are integrally connected together. More specifically, a wide spiral guide 226' is integrally molded with a front portion 232B'. As in the above embodiments, the inner diameter of the annular guide member (the inner diameter of a guide ring 228) is smaller than the inner diameter of the spiral guide 226'. Cushioning members 234 are bonded respectively to predetermined portions of the spiral guide 226' at the outer periphery thereof so as to prevent noises which would otherwise be produced, for example, because of the presence of a gap between the spiral guide and the inner surface of the rod tube. Alternatively, a coating film may be applied. Instead, a tubular member of a soft resin or rubber, such as a vinyl tube, may be fitted on the spiral guide so as to achieve a cushioning effect. In this case, a plurality of tubular members each having a length corresponding to a pitch of the spiral winding may be provided at suitable intervals, or one continuous tubular member may be fitted on the spiral guide. When such cushioning member or members are provided on the continuous guide of the other embodiment, the same effect is achieved.

Figure 20:
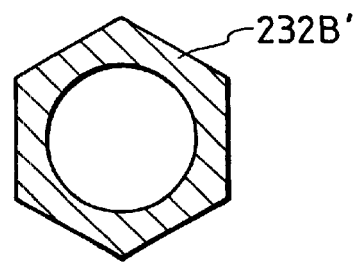
FIG. 20 is a transverse cross-sectional view taken along the line XX—XX of FIG. 19.

The front portion 232B' has a polygonal (hexagonal) transverse cross-section as shown in FIG. 20. If this front portion has such a size that the corners of this polygon are slightly held against the inner surface of the rod tube when the spiral guide is inserted into the rod tube, or if the inner surface of the rod tube has a polygonal shape, the spiral guide 226' can be kept twisted a certain angle in a radially-expanding direction or a radially-contracting direction, so that the gap between the guide 226' and the inner surface of the rod tube can be adjusted.

Figure 21:
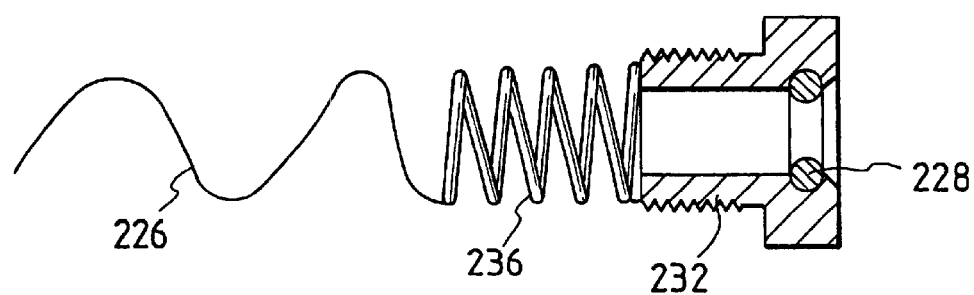
FIG. 21 is a view showing a rear end portion of a modified spiral guide.

In FIG. 21, a coil spring member 236 is connected between a plug 232 and a spiral guide 226. The length of this structure from the plug 232 to the front end of the spiral guide 226 in its normal condition is slightly greater than the length of insertion of this structure into the rod tube. With this construction, when this structure is inserted into the rod tube, the coil spring 36 is contracted to urge the spiral guide 226 forwardly to hold the same against shaking.

In order to prevent the shaking of the spiral guide due to the gap between the spiral guide and the inner surface of the rod tube and also to prevent noises from being produced when the rod is greatly deformed or flexed by a caught fish, the spiral guide can be made of a shape memory alloy of Ni—Ti, or Cu—Zn—Al, or a shape memory resin. More specifically, the outer diameter of the spiral guide is kept large at an ordinary temperature during the fishing, and the outer diameter of the spiral guide becomes smaller at a predetermined time higher or lower than the ordinary temperature. When the spiral guide made of such a shape memory alloy is to be inserted into the rod tube, the spiral guide is heated into the predetermined higher temperature or is cooled into the predetermined lower temperature, so that the spiral guide is reduced in outer diameter. In this condition, the spiral guide is easily inserted into the rod tube. Thereafter, the temperature of the spiral guide rises to the ordinary temperature, the spiral guide is radially expanded to be held in firm contact with the inner surface of the rod tube, thereby preventing the shaking and noises. The shape memory alloy such as Ni—Ti alloy and the shape memory resin is excellent in corrosion resistance, and is suited for the fishing rod. The shape memory alloy or the shape alloy resin can be applied not only to the spiral guide but also to the above-mentioned continuous guides.

As is clear from the above description, in the present invention, the annular guide member is provided at the end of the continuous guide, and therefore the fishline is guided by the annular guide member, so that the fishline will not be caught by this end, and also the resistance to the passage of the fishline is prevented from increasing.

The inner diameter of the annular guide member can be made smaller than the inner diameter of that portion of the continuous guide disposed adjacent to the annular guide member. With this construction, even when the fishline is shaken, the shaking is reduced by this annular guide member. As a result, the contact of the fishline with the inner surface of the rod tube is reduced, and the fishline is prevented from contacting waterdrops on this inner surface, and therefore the resistance to the passage of the fishline is reduced.

A preferred method of forming the inter-line fishing rod of the present invention will now be described in further detail with reference to FIGS. 22–27.

Figure 22:
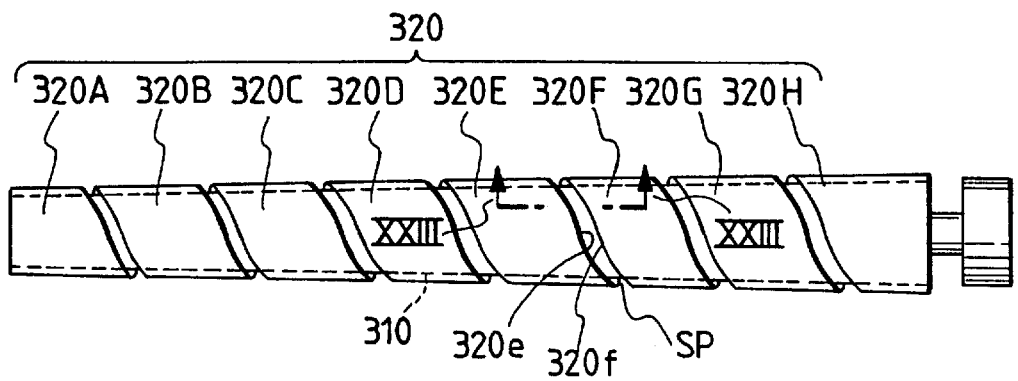
FIG. 22 is a side-elevational view showing one step of a first method of producing an intra-line fishing rod according to the present invention.
Figure 23:
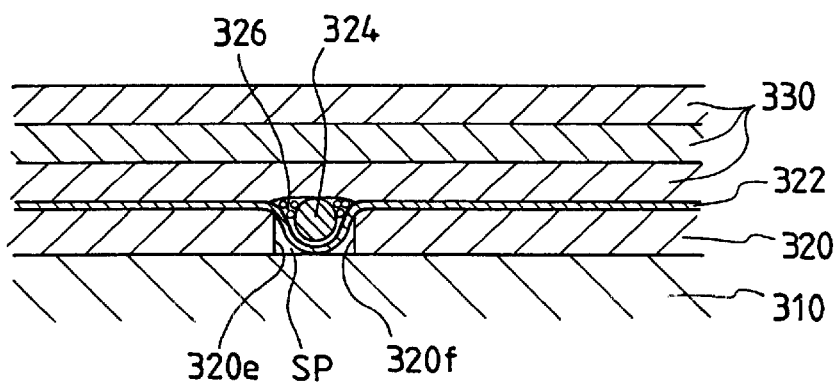
FIG. 23 is a cross-sectional view taken along the line XXIII—XXIII of FIG. 22, showing a condition after a heating operation.

FIG. 22 is a side-elevational view showing one step of a process of producing an intra-line fishing rod according to the invention, and FIG. 23 is an enlarged, cross-sectional view taken along the line XXIII—XXIII of FIG. 22, showing a condition after the winding of a prepreg and a thermosetting treatment are effected. First, a relatively thick winding member 320, made of a natural or an artificial material such as leather, silicone, Teflon (polytetrafluoroethylene) and rubber, is wound on a surface of a mandrel.

The winding member 320 is in the form of a narrow strip, and is spirally wound on the mandrel at such a pitch that a spiral gap SP for receiving a wire-like fishline guide member 324 is formed between opposite side edges of the winding member 320. Then, a thin soft member 322 of a highly heat-resistant material, such as polyethylene naphthalate (PEN) and polyethylene terephthalate (PET), is applied to cover the spiral gap SP. In this embodiment, to facilitate the winding operation, the thin soft member 322 is wound over the entire surface of the thick winding member 320.

A release agent is coated onto the thin soft member 322, and then the fishline guide member 324 is wound along the spiral gap SP. The fishline guide member 324 comprises carbon fibers or ceramics fibers with a large diameter, or a strap-like, fiber-reinforced prepreg, or a strap-like, fiber-reinforced prepreg reinforced by metal or ceramics (Such prepreg is similar to a prepreg for forming a rod tube). Then, fiber-reinforced prepregs 30 are wound several times thereon. The prepreg 330 is formed by impregnating reinforced fibers (e.g. carbon fibers) with a thermosetting resin or the like. Therefore, according to an ordinary method, this assembly is pressurized and heated to form the rod tube.

Referring to FIG. 23 showing the cross-section (along the line XXIII—XXIII of FIG. 22) of the rod tube obtained after the heating operation, a resin 326 flows from the fiber-reinforced prepregs 330 into gaps adjacent to the fishline guide member 324 during the hot molding, thereby integrally connecting the fishline guide member 324 to the rod tube. The fishline guide member 324 is received in the gap SP formed between the side edges 320e and 320f of the thick winding member 320, so that the thin soft member 322 is forced into this gap SP. The presence of this thin soft member 322 prevents the flowed resin from forming any corner or angle around the fishline guide member 324, so that the resin has a smooth surface, as shown in FIG. 23. Thereafter, the mandrel is withdrawn, and the thick winding member 320 and the thin soft member 322 are removed. Part of the thin soft member 322 may remain. Thus, the fishline guide 324 is fixedly secured to the rod tube, and projects from the inner surface of the rod tube, and the surface of the fishline guide 324 is smooth, and can smoothly guide the fishline.

In this embodiment, although the fishline guide member 324 comprises the single wire-like member, and is fixedly secured to the inner surface of the rod tube in a spiral, continuous manner, the invention is not limited to such an arrangement. The thick winding members 320 may be divided into a plurality of sections 320A, 320B . . . 320H, in which case these sections are wound on the mandrel at suitable intervals to form a gap between opposed side edges of any two adjacent sections, and separate fishline guide members are provided in these gaps, respectively. Thus, the fishline guide member can be replaced by annular or ring-shaped guide members. In order to increase the strength of bonding of the fishline guide member 324 to the inner surface of the rod tube, the fishline guide member 324 may have, for example, a semi-circular transverse cross-section, in which case the fishline guide member is installed, with its flat side or surface facing the inner surface of the rod tube (that is, with the flat surface facing away from the surface of the mandrel).

The fishline guide member 324 may be installed at part of the fishing rod, or may be installed generally over the entire length of the fishing rod. Any other suitable fishing guide member or members formed by other methods may be mounted within the rod tube.

Figure 24:
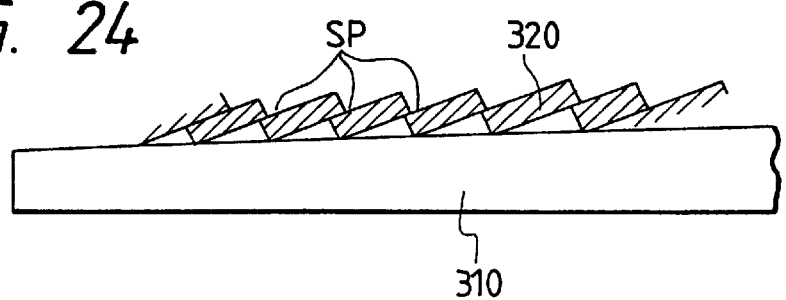
FIG. 24 is a side-elevational view showing one step of a second method of producing an intra-line fishing rod according to the invention.

FIG. 24 is a view explanatory of a second method of the invention. A strip-like winding member 320 as used in the first method is wound on a surface of a mandrel 310, with its opposite edge portions overlapping each other. A recess SP, formed at a step portion at the boundary between the overlapping portions and open portions of the winding member 320, is covered with a soft thin member as used in the first method, and then a release agent is coated onto this thin soft material. The other steps are similar to those of the first method.

Figure 25:
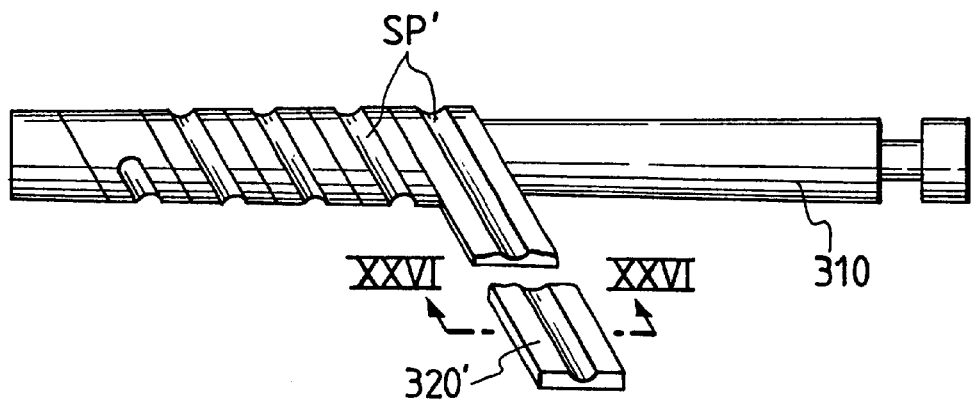
FIG. 25 is a side-elevational view showing one step of a third method of producing an intra-line fishing rod according to the invention.
Figure 26:
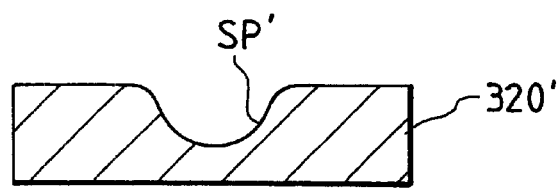
FIG. 26 is an enlarged, transverse cross-sectional view of a winding member used in the method of FIG. 25.

FIG. 25 is a view showing one step of a third method of the invention. A groove SP' is preformed in a width-wise central portion of a thick, strip-like winding member 320', and this winding member 320' is wound tightly on a mandrel 310, with its opposite side edges held in contact with each other. FIG. 26 shows a transverse cross-section of the winding member 320' on an enlarged scale. The surface of the groove SP' is smooth. A release agent is coated onto the winding member 320', and then a fishline guide member as used in the above embodiments is provided in the groove SP', and then fiber-reinforced prepregs are wound thereon. Thereafter, according to an ordinary method, the manufacture of the fishing rod proceeds, and a resin, flowed from the prepregs to those regions around the fishline guide, will not form any corner or angle since the groove SP' has the smooth surface. After the mandrel 310 is withdrawn, the winding member 320' is removed. In this embodiment, the groove SP' is not formed in that portion of the winding member 320' disposed at the front end portion of the mandrel 310. The reason for this is that the fishline guide is not formed at the front end portion of the rod tube which is adapted to be connected to an associated rod tube.

Preferably, the depth of the groove SP' is not less than 0.3 mm, and the width thereof is suitably determined depending on the width of the fishline guide member, an inclination angle and so on. Preferably, the thickness of the winding member 320' is not less than 0.5 mm. Preferably, a thin soft member as described above is provided to cover the wound winding member so as to prevent the production of burrs due to a gap formed between the opposite side edges of the wound winding member. If the surface of the groove SP' is not smooth, the groove is covered with a soft thin member as described for the first and second methods.

Figure 27:
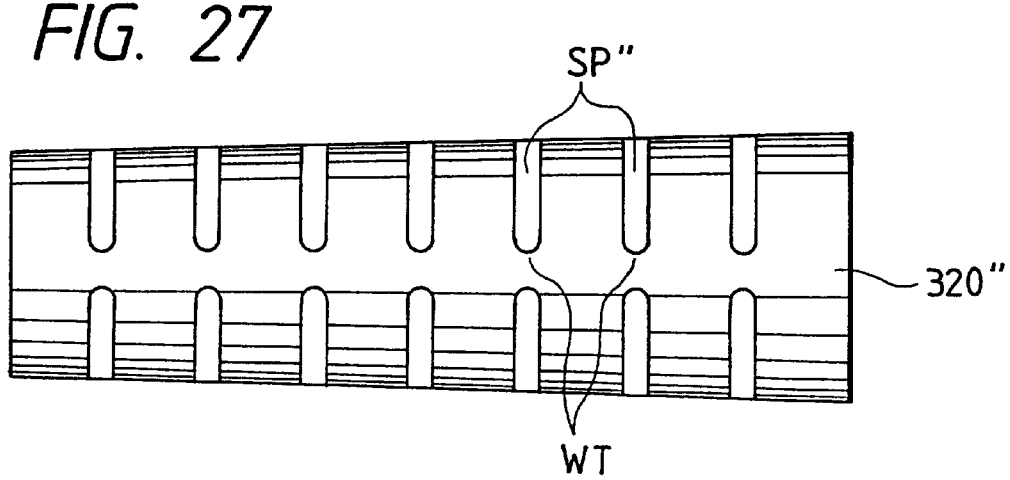
FIG. 27 is a plan view of a modified winding member used in the third method.

Instead of using the strip-like winding member 320', there may be used a sheet-like winding member 320" having grooves SP", and this sheet-like winding member is wound once on the mandrel (see FIG. 27). In this case, the size of the sheet is so determined that the opposite edges will not overlap each other. If there is formed a gap between the opposite edges, this gap is covered with a thin soft member as described above. In this winding member 320", the grooves SP" are interrupted at a region WT, and a water passage is formed on that portion of the inner surface of the rod tube corresponding to this interrupting region. In the above production methods, such a water passage can be formed by closing part of the gap SP or by interrupting the gap SP'.

As is clear from the above description referencing FIGS. 22–27, in the present invention, there can be provided the intra-line fishing rod in which the fibers of the rod tube are prevented from meandering, and the fishline guide member stably projects from the inner surface of the rod tube, and the fishline can be smoothly guided, thus reducing the resistance to the passage of the fishline.

While the foregoing invention has been shown and described with reference to the embodiments of the appended drawings, it will be understood by those having skill in the art that various changes in form and detail may be made therein without departing from the spirit and scope of the invention.

What is claimed is:

1. An intra-line fishing rod having a passageway extending along a longitudinal axis for passing a fishline through an interior of said fishing rod, said fishing rod comprising:
   a rod tube comprising a synthetic resin as a matrix and reinforced by reinforced fibers, said rod tube having inner and outer surfaces extending along the longitudinal axis, said inner surface defining said passageway for passing said fishline through said interior said fishing rod;
   a fishline guide for guiding said fishline within said rod tube along said longitudinal axis, said fishline guide projecting from the inner surface of said rod tube and said fishline guide being connected integrally to said rod tube as a consequence of thermal molding of the rod tube, said fishline guide having an outer peripheral surface abutting the inner surface of said rod tube between a front and rear side of said fishline guide; and
   a cushioning means formed respectively at said front and said rear side of said fishline guide to form a connection between said rod tube and said fishline guide so as to reduce stress concentration when said rod tube is flexed.

2. The intra-line fishing rod according to claim 1, wherein said rod tube is composed predominantly of axially-extending fibers.

3. The intra-line fishing rod according to claim 1, wherein said cushioning means are formed by a flow of synthetic resin on said front and rear sides of said guide.

4. The intra-line fishing rod according to claim 1, wherein said cushioning means is smaller in bending modulus than a contact region of said guide positioned for contact with said fishline.

5. The intra-line fishing rod according to claim 1, wherein a plurality of said guides are formed of a synthetic resin, and are spaced at short intervals along longitudinal axis of said rod tube.

6. The intra-line fishing rod according to claim 1, wherein at least one of said inner surface of said rod tube adjacent said fishline guide, and said contact portion of said fishline guide is formed into a mirror-like smooth surface having a surface roughness of not more than about 2 $\mu$.

7. The intra-line fishing rod according to claim 1, wherein said fishline guide spirally extends continuously along said longitudinal axis, and an annular guide member is provided at an end of said continuous guide.

8. The intra-line fishing rod according to claim 7, wherein an inner diameter of said annular guide member is smaller than an adjacent inner diameter of that portion of said continuous guide disposed adjacent to said annular guide member.

9. An intra-line fishing rod having a passageway extending along a longitudinal axis for passing a fishline through an interior of said fishing rod, said fishing rod comprising:
   a rod tube comprising a synthetic resin as a matrix and reinforced by reinforced fibers, said rod tube having inner and outer surfaces extending along the longitudinal axis, said inner surface defining said passageway for passing said fishline through said interior said fishing rod;
   a fishline guide for guiding said fishline within said rod tube along said longitudinal axis, said fishline guide formed integrally with and projects from the inner surface of said rod tube, said fishline guide having an outer peripheral surface abutting the inner surface of said rod tube between a front and rear side of said fishline guide; and
   a cushioning means formed respectively at said front and said rear side of said fishline guide to form a connection between said rod tube and said fishline guide so as to reduce stress concentration when said rod tube is flexed, wherein said fishline guide spirally extends continuously along said longitudinal axis.

10. The intra-line fishing rod according to claim 9, wherein said continuous guide extends the entire length of the rod tube in the longitudinal direction.

11. The intra-line fishing rod according to claim 9, wherein said continuous guide extends only a portion of the length of the rod tube in the longitudinal direction.

12. The intra-line fishing rod according to claim 9, wherein a distal end portion of said fishline guide is densely arranged in contact with the inner surface of an end portion of said rod tube over a predetermined length along said longitudinal axis of said rod tube.

13. An intra-line fishing rod having a passageway extending along a longitudinal axis for passing a fishline through an interior of said fishing rod, said fishing rod comprising:
   a rod tube comprising a synthetic resin as a matrix and reinforced by reinforced fibers, said rod tube having inner and outer surfaces extending along the longitudinal axis, said inner surface defining said passageway for passing said fishline through said interior said fishing rod;
   a fishline guide for guiding said fishline within said rod tube along said longitudinal axis, said fishline guide formed integrally with and projects from the inner surface of said rod tube, said fishline guide having an outer peripheral surface abutting the inner surface of said rod tube between a front and rear side of said fishline guide; and
   a cushioning means formed respectively at said front and said rear side of said fishline guide to form a connection between said rod tube and said fishline guide so as to reduce stress concentration when said rod tube is flexed, wherein a curved surface of a bottom portion of said fishline guide connected to the inner surface of the rod tube is defined by a concavely-curved surface adjoining said inner surface, and a convexly-curved surface extending from said concavely-curved surface and covering the top and a side surface of said guide.

14. An intra-line fishing rod having a passageway extending along a longitudinal axis for passing a fishline through an interior of said fishing rod, said fishing rod comprising:
   a rod tube comprising a synthetic resin as a matrix and reinforced by reinforced fibers, said rod tube having inner and outer surfaces extending along the longitudinal axis, said inner surface defining said passageway for passing said fishline through said interior said fishing rod;
   a fishline guide for guiding said fishline within said rod tube along said longitudinal axis, said fishline guide formed integrally with and projects from the inner surface of said rod tube, said fishline guide having an outer peripheral surface abutting the inner surface of said rod tube between a front and rear side of said fishline guide; and
   a cushioning means formed respectively at said front and said rear side of said fishline guide to form a connection between said rod tube and said fishline guide so as to reduce stress concentration when said rod tube is flexed, wherein said fishline guide is disposed within an annular recess formed on said inner surface of said rod tube.

15. An intra-line fishing rod having a passageway extending along a longitudinal axis for passing a fishline through an interior of said fishing rod, said fishing rod comprising: a rod tube comprising a synthetic resin as a matrix and reinforced by reinforced fibers, said rod tube having inner and outer surfaces extending along the longitudinal axis, said inner surface defining said passageway for passing said fishline through said interior said fishing rod; a fishline guide for guiding said fishline within said rod tube along said longitudinal axis, said fishline guide formed integrally with and projects from the inner surface of said rod tube, said fishline guide having an outer peripheral surface abutting the inner surface of said rod tube between a front and rear side of said fishline guide; and a cushioning means formed respectively at said front and said rear side of said fishline guide to form a connection between said rod tube and said fishline guide so as to reduce stress concentration when said rod tube is flexed, wherein said fishline guide is formed of a synthetic resin having a plurality of circumferentially arranged reinforcing fibers embedded therein.

16. An intra-line fishing rod having a passageway extending along a longitudinal axis for passing a fishline through an interior of said fishing rod, said fishing rod comprising:
   a rod tube comprising a synthetic resin as a matrix and reinforced by reinforced fibers, said rod tube having inner and outer surfaces extending along the longitudinal axis, said inner surface defining said passageway for passing said fishline through said interior said fishing rod, wherein said rod tube includes an inner reinforcing (12B);
   an outer reinforcing layer (12A);
   a body layer (12H) disposed between said reinforcing outer layer (12A) and said inner reinforcing layer; and a cushioning layer (33) formed of resin disposed between said inner reinforcing layer and said body layer;

a fishline guide for guiding said fishline within said rod tube along said longitudinal axis, said fishline guide formed integrally with and projects from the inner surface of said rod tube and mounted proximate said cushioning layer; and a cushioning means formed between said guide and a body layer of said rod tube to form a connection therebetween thereby reducing stress concentration when said rod tube is flexed.

17. An inter-line fishing rod having a passage extending along a longitudinal axis for passing a fishline through an interior of said fishing rod, said fishing rod comprising:

a rod tube thermally molded of a synthetic resin as a matrix and reinforced fibers as a reinforcement, said tube having inner and outer surfaces extending along the longitudinal axis, said inner surface defining said passage for passing said fishline through said interior of said fishing rod; and a fishline guide for guiding said fishline within said rod tube along said longitudinal axis, said fishline guide being connected integrally to said rod tube as a consequence of thermal molding of the rod tube, said fishline guide having a central region and front and rear regions each having a resin content higher than a resin content of said central region.

18. An inter-line fishing rod according to claim 17, wherein said fishline guide is thermally molded simultaneously when said rod tube is thermally molded.

19. An inter-line fishing rod according to claim 17, wherein at least said front and rear regions of said fishline guide are thermally molded simultaneously when said rod tube is thermally molded.

20. An inter-line fishing rod according to claim 19, wherein said front and rear regions are formed of synthetic resin of said rod tube.

21. An inter-line fishing rod according to claim 17, wherein said fishline guide has an outer side region located radially between said central region and said rod tube, said outer side region having a resin content higher than a resin content of said central region.

22. An inter-line fishing rod according to claim 17, wherein each of said front and rear regions decreases in thickness progressively away from the central region.

23. An intra-line fishing rod having a passageway extending alone a longitudinal axis for passing a fishline through an interior of said fishing rod, said fishing rod comprising:

a rod tube comprising a synthetic resin as a matrix and reinforced by reinforced fibers, said rod tube having inner and outer surfaces extending along the longitudinal axis, said inner surface defining said passageway for passing said fishline through said interior said fishing rod;

a fishline guide for guiding said fishline within said rod tube along said longitudinal axis, said fishline guide formed integrally with and projects from the inner surface of said rod tube; and a cushioning means formed between said guide and a body layer of said rod tube for reducing stress concentration when said rod tube is flexed, wherein said cushioning means is smaller in bending modulus than a contact region of said guide positioned for contact with said fishline and said fishline guide comprises synthetic resin as a matrix; and one of a synthetic resin region and a synthetic resin-reinforcement mixture region having a higher synthetic resin content is provided respectively at front and rear sides of said contact region and between said contact region and a body layer of said rod tube having the fibers oriented generally in the direction of an axis of said rod tube, wherein said contact region of said guide has a higher content of a reinforcing material.

* * * * *